United States Patent
Yagi

(10) Patent No.: US 10,233,765 B2
(45) Date of Patent: Mar. 19, 2019

(54) SEAL FOR TURBOFAN ENGINE

(71) Applicant: IHI Corporation, Koto-ku (JP)

(72) Inventor: Hiroyuki Yagi, Tokyo (JP)

(73) Assignee: IHI Corporation, Koto-ku (JP)

( * ) Notice: Subject to any disclaimer, the term of this patent is extended or adjusted under 35 U.S.C. 154(b) by 385 days.

(21) Appl. No.: 15/068,750

(22) Filed: Mar. 14, 2016

(65) Prior Publication Data

US 2016/0194971 A1 Jul. 7, 2016

Related U.S. Application Data

(63) Continuation of application No. PCT/JP2014/073643, filed on Sep. 8, 2014.

(30) Foreign Application Priority Data

Sep. 18, 2013 (JP) .................................. 2013-192710

(51) Int. Cl.
 *F01D 11/00* (2006.01)
 *F01D 9/04* (2006.01)
 *F02K 3/04* (2006.01)

(52) U.S. Cl.
 CPC ............ *F01D 11/005* (2013.01); *F01D 9/041* (2013.01); *F01D 9/042* (2013.01); *F02K 3/04* (2013.01); *F05D 2220/36* (2013.01); *F05D 2240/14* (2013.01); *F05D 2250/292* (2013.01); *F05D 2300/431* (2013.01); *F05D 2300/501* (2013.01)

(58) Field of Classification Search
 None
 See application file for complete search history.

(56) References Cited

U.S. PATENT DOCUMENTS

| 4,940,386 A | 7/1990 | Feuvrier et al. |
| 5,820,338 A | 10/1998 | Kasprow et al. |
| 5,890,874 A * | 4/1999 | Lambert ............... F01D 11/008 |
| | | 416/193 A |

(Continued)

FOREIGN PATENT DOCUMENTS

| EP | 0 250 324 A1 | 12/1987 |
| EP | 0 277 884 A2 | 8/1988 |

(Continued)

OTHER PUBLICATIONS

International Search Report dated Nov. 25, 2014 in PCT/JP2014/073643, filed Sep. 8, 2014 (with English Translation).

(Continued)

*Primary Examiner* — Justin Seabe
*Assistant Examiner* — Juan G Flores
(74) *Attorney, Agent, or Firm* — Oblon, McClelland, Maier & Neustadt, L.L.P.

(57) ABSTRACT

A seal for sealing a gap between a vane and a liner of an outlet guide vane is provided. The seal includes: a joint section for joining with the liner; a flexible fillet section elongated from the joint section and tapering toward a tip so as to form a round corner between the vane and the liner when the tip is placed in contact with the vane; and a flexible rib section projecting from an inner surface and so dimensioned as to get in contact with an upper surface of an external structure for securing the vane to keep gas tightness.

5 Claims, 5 Drawing Sheets

(56) References Cited

U.S. PATENT DOCUMENTS

| | | | |
|---|---|---|---|
| 5,957,658 A | 9/1999 | Kasprow et al. | |
| 8,523,189 B2 * | 9/2013 | Harper | F01D 11/008 277/650 |
| 2001/0019695 A1 | 9/2001 | Correia | |
| 2007/0098548 A1 | 5/2007 | Barnett et al. | |
| 2007/0098557 A1 | 5/2007 | Barnett et al. | |
| 2009/0269203 A1 | 10/2009 | Care et al. | |
| 2010/0077612 A1 * | 4/2010 | Tudor | F01D 11/005 29/889.22 |
| 2010/0322772 A1 | 12/2010 | Hoyland et al. | |
| 2011/0037233 A1 * | 2/2011 | Harper | F01D 11/008 277/551 |
| 2011/0243744 A1 | 10/2011 | Forgue et al. | |
| 2012/0244007 A1 | 9/2012 | Mason | |

FOREIGN PATENT DOCUMENTS

| | | |
|---|---|---|
| FR | 2 599 081 A1 | 11/1987 |
| GB | 2490858 A | 11/2012 |
| JP | 10-325303 | 12/1998 |
| JP | 2001-193409 | 7/2001 |
| JP | 2009-508033 | 2/2009 |
| JP | 2011-85055 | 4/2011 |
| JP | 2011-85056 A | 4/2011 |
| JP | 2012-511661 | 5/2012 |
| SU | 213904 A1 | 6/1968 |

OTHER PUBLICATIONS

Written Opinion dated Nov. 25, 2014 in PCT/JP2014/073643, filed Sep. 8, 2014.

Extended European Search Report dated Mar. 17, 2017 in Patent Application No. 14845489.5.

Office Action dated Jul. 4, 2017 in Japanese Patent Application No. 2013-192710.

Office Action dated Jun. 22, 2017 in Russian Patent Application No. 2016114283/06.

Decision on Grant Patent for Invention dated Nov. 9, 2017 in Russian Patent Application No. 2016114283 (with English language translation), 8 pages.

\* cited by examiner

SEAL FOR TURBOFAN ENGINE

CROSS-REFERENCE TO RELATED APPLICATIONS

This application is a Continuation Application of PCT International Application No. PCT/JP2014/073643 (filed Sep. 8, 2014), which is in turn based upon and claims the benefit of priority from Japanese Patent Application No. 2013-192710 (filed Sep. 18, 2013), the entire contents of which are incorporated herein by reference.

BACKGROUND

Technical Field

The disclosure relates to a seal for a turbofan engine, and in particular relates to a seal for sealing a gap between a vane and a liner of an outlet guide vane.

Description of the Related Art

A turbofan engine is a jet engine of a type that has a bypass duct around an engine as a core. Part of energy generated by the engine drives a fan, part of an airflow generated by the fan is compressed by a compressor and then used for combustion in the engine while another part gushes out rearward directly through the bypass duct. The airflow through the bypass duct by itself produces thrust that contributes increase in engine thrust and also improves energy efficiency of the engine.

In the bypass duct provided are outlet guide vanes. The outlet guide vanes are a plurality of vanes elongated in respective radial directions and such vanes are arranged circumferentially to form a circular structure. The airflow generated by the fan is at first whirling flow but is, after passing through the outlet guide vanes, rectified into flow going straight rearward. As the outlet guide vanes may also function as a support that connects a fan case defining the bypass duct with the core portion, they require strength and stiffness required for such a function in addition.

Leakage of the airflow in the bypass duct to the exterior or mixture with secondary air should be avoided in view of efficiency of the fan. Therefore at any gaps between vanes and liners of the outlet guide vanes required are proper seals for sealing airflow therein.

The following documents disclose related arts.

Published Japanese Translation of PCT Application No. 2012-511661

Japanese Patent Application Laid-open No. H10-325303

SUMMARY

As described above, the seals in the outlet guide vanes are required to have sufficient gas-tightness. In addition, while a vane and a liner form an angle akin to a right angle, an angular corner therebetween gives rise to cause of turbulence. The seals are therefore required to smoothly connect a face of the vane to a face of the liner. Such seals are not readily produced by any automated work but generally require laborsome processes, such as processes of building up paste-like sealing agent on objective sites by hand working, curing it and thereafter finishing it, for example.

The content of the disclosure herein has been created in light of the aforementioned problem and, according to an aspect thereof, provides a seal capable of sealing airflow whereas this seal merely requires being attached to a liner and, along with the liner and a vane, being integrated into outlet guide vanes.

According to an aspect, a seal for sealing a gap between a vane and a liner of an outlet guide vane is comprised of: a joint section for joining with the liner; a flexible fillet section elongated from the joint section and tapering toward a tip so as to form a round corner between the vane and the liner when the tip is placed in contact with the vane; and a flexible rib section projecting from an inner surface and so dimensioned as to get in contact with an upper surface of an external structure for securing the vane to keep gas tightness.

DETAILED DESCRIPTION OF THE EXEMPLARY EMBODIMENTS

Exemplary embodiments will be described hereinafter with reference to the appended drawings. It is particularly noted that these drawings are not always drawn to scale exactly and therefore dimensional relations among elements are not limited to those shown therein.

Figure 1:
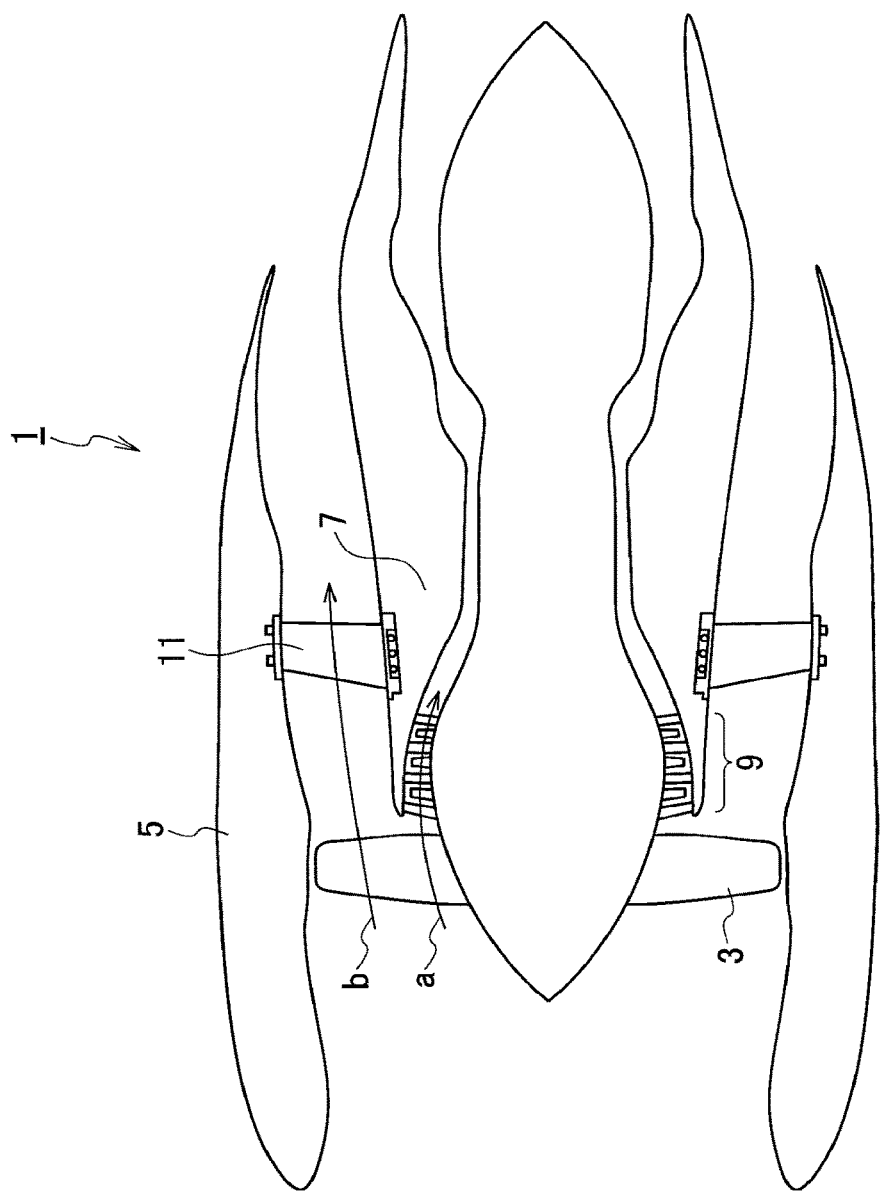
FIG. 1 is a schematic sectional view of a turbofan engine.

Referring to FIG. 1, a turbofan engine 1 is, as an example, comprised of a fan 3 at its center, and an inner wall of a nacelle 5 surrounding its circumference and a core portion 7 define a bypass duct. Part a of an airflow generated by the fan 3 flows into a low-pressure compressor 9 and is used by combustion in the engine but another part b thereof flows into the bypass duct. The part b of the airflow passing through the bypass duct is rectified by outlet guide vanes comprised of a plurality of vanes 11 and then gushes out rearward.

Figure 2:
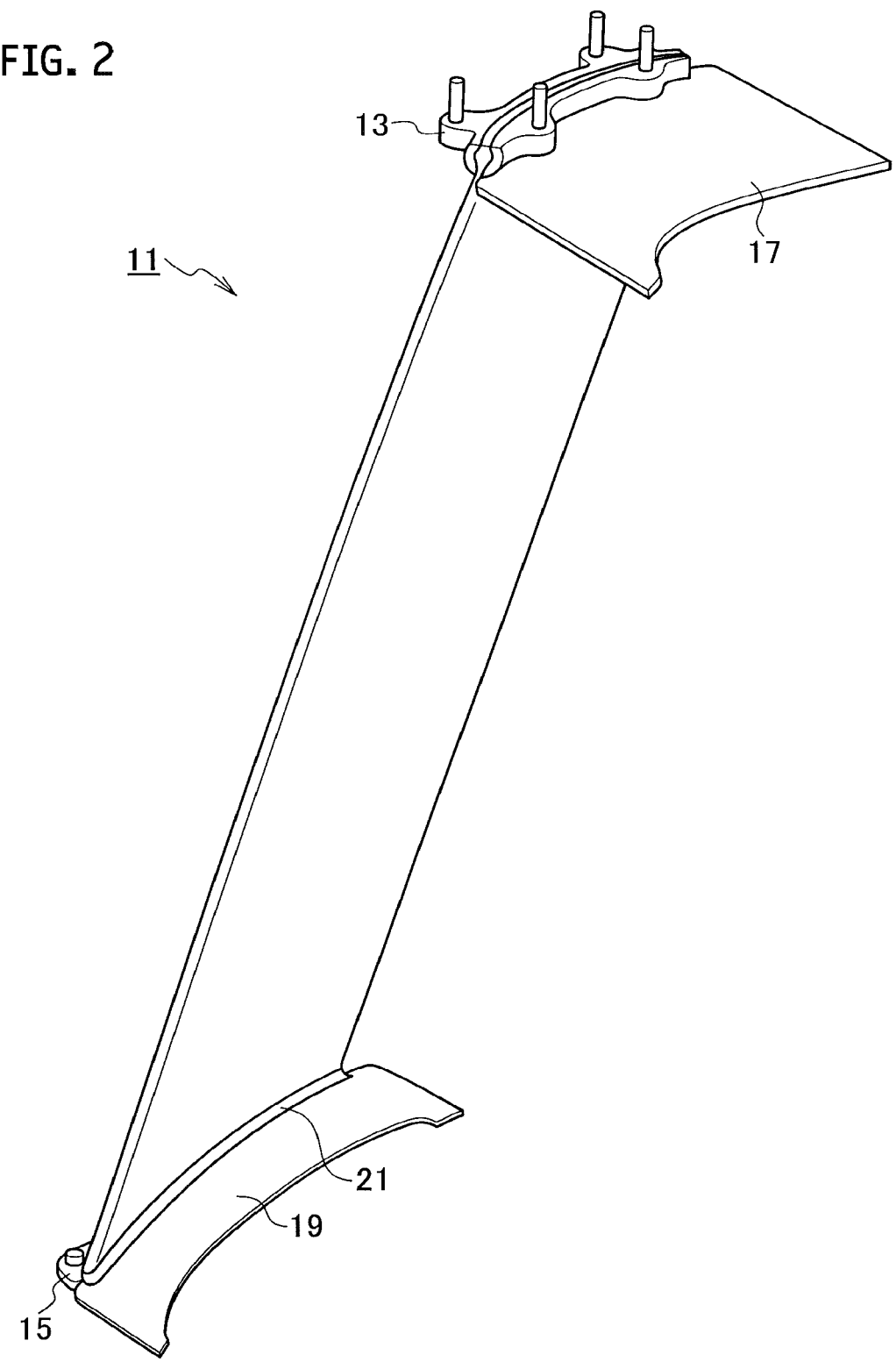
FIG. 2 is a perspective view of an outlet guide vane into which seals are integrated in accordance with an embodiment.

Referring to FIG. 2, each vane 11 is a plate-like structure having an airfoil shape for airflow rectification and being elongated in the radial direction. Its outer end is pinched by a support structure 13, and its inner end is pinched by a similar support structure 15, thereby being fixed to the nacelle 5 and the core portion 7.

Adjacent to the structure 13 for fixing the outer end, having its edge in contact with a face of the vane 11, an outer liner 17 is disposed. Similarly, adjacent to the structure 15 for fixing the inner end, having its edge in contact with the face of the vane 11, an inner liner 19 is disposed. Plural combinations of the vanes 11 and the liners 17, 19 are arranged circumferentially to meet side by side, thereby constituting a circular structure. The plurality of outer liners 17 arranged in a cylindrical shape constitutes a part of the inner wall of the nacelle 5, and the plurality of inner liners 19 similarly constitutes a part of the outer wall of the core portion. The outer liners 17 and the inner liners 19 thus define the bypass duct.

Figure 3A:
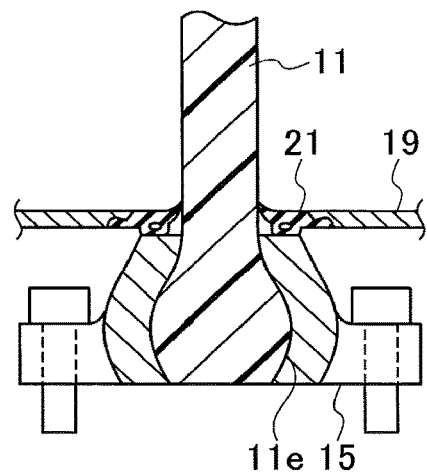
FIG. 3A is a partial sectional view of the outlet guide vane, particularly showing a relation between the seal and a structure for securing the vane.
Figure 3B:
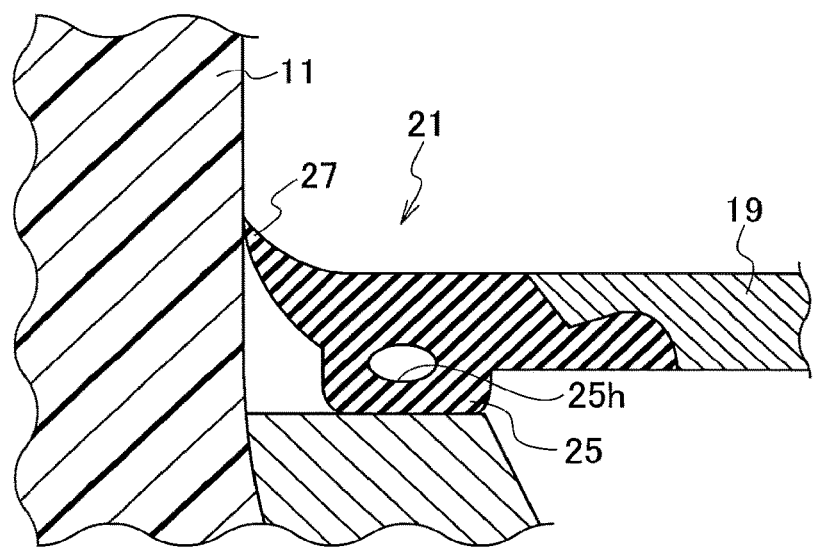
FIG. 3B is a partial sectional view of the outlet guide vane, showing a magnified view of the seal in particular.

Referring to FIGS. 3A and 3B in combination with FIG. 2, a seal 21 of the present embodiment is used for sealing a gap between the inner liner 19 and the vane 11 for example. Of course it may be applied to a gap between the outer liner 17 and the vane 11 or used in order to seal any other arbitrary gaps. An example where the seal is applied to the inner liner 19 will be described hereinafter but is of course not limiting.

Referring mainly to FIG. 3A and FIG. 3B, while the inner end lie of the vane 11 is pinched by the structure 15 for fixing the inner end as described above, the structure 15 has a flat top face just above the inner end lie. The seal 21 has its tip in contact with the surface of a face of the vane 11 and as well gets in contact with this top face, thereby sealing airflow.

Figure 4:
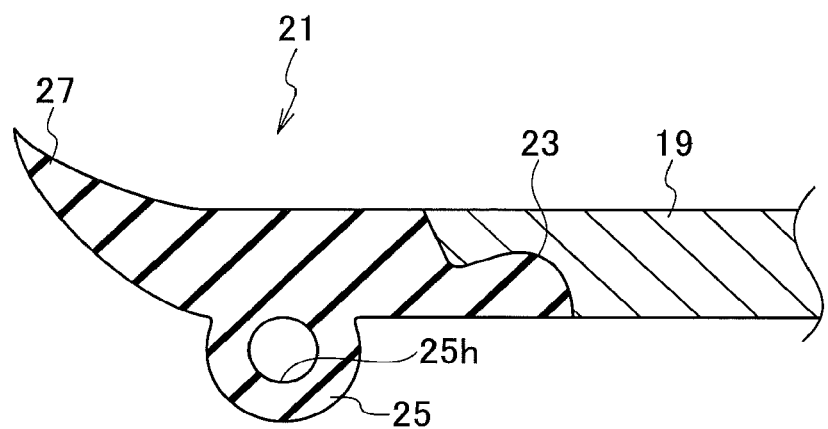
FIG. 4 is a sectional view of the seal with a part of a liner.

Referring to FIG. 4, the seal 21 is combined with an end of the inner liner 19 and then used. The seal 21 is comprised of a joint section 23, which may have a proper structure adapted to combination with the inner liner 19. Such a structure may be either a proper concave-convex as shown in the drawing for the purpose of engagement or any other structure increasing contact area. Increase in contact area is advantageous for bonding the seal 21 with the inner liner 19.

The seal 21 around its proximal end is comparable in thickness to the inner liner 19 for example but has a fillet section 27 that makes gradually thinner toward its tip. The seal 21 is, at least at the fillet section 27, flexible but may alternatively be totally flexible. To give flexibility thereto, an elastomer such as synthetic rubber may be applied to the seal 21. The fillet section 27 is so flexible to warp upward when it gets contact with the vane 11, thereby forming a round corner between the inner liner 19 and the vane 11. To make it easy to warp upward, the fillet section 27 may be formed in advance to be curved upward as shown in the drawing.

In addition, the seal 21 has a rib section 25 projecting from its inner surface. The rib section 25 is a projection along the lengthwise direction of the seal 21 and spans substantially its entire length. The rib section 25 is also flexible so as to elastically crush when it gets contact with the top face of the structure 15 for fixing the vane 11 and then comes in close contact therewith. The rib section 25 thus keeps gas tightness in combination with the top face of the structure 15. Proper position and dimensions are selected in the rib section 25 in accordance with the position of the top face of the structure 15 and the distance from the seal 21 to the top face of the structure 15.

Figure 5:
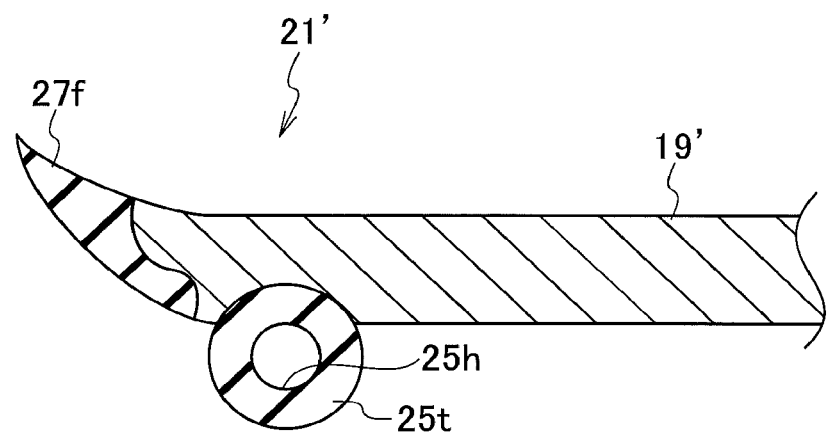
FIG. 5 is a sectional view of the seal in accordance with a modified example.

The rib section 25 and the fillet section 27 are preferably formed in a unitary body as shown in FIG. 4. However, they may be separate bodies like as a rib 25t and a fillet 27f in a seal 21' as shown in FIG. 5. In this case, the rib section 25t is directly joined with the inner liner 19'.

Figure 6:
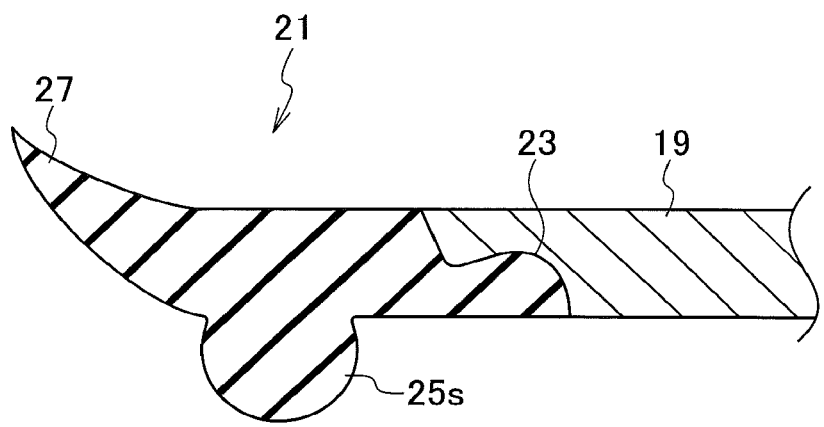
FIG. 6 is a sectional view of the seal in accordance with another modified example.
Figure 7:
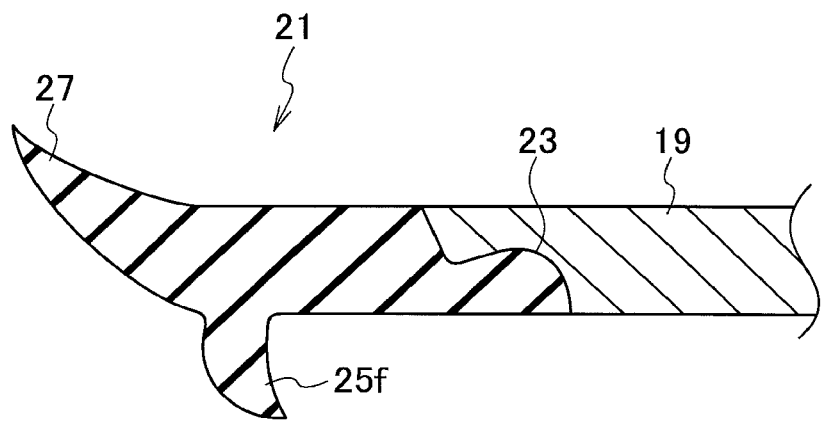
FIG. 7 is a sectional view of the seal in accordance with still another modified example.

To a shape for the rib section applicable is a hollow and cylindrical column having a hole 25h in its interior in order to facilitate elastic crush, but a solid rib section 25s as shown in FIG. 6 may be also applicable. Alternatively, instead of the column, an elliptic column, a polygonal column, or any other proper shape may be selected. Still alternatively, as shown in FIG. 7, a fillet shape tapering toward a tip may be also applied to the rib section 25f. The rib section 25f may be properly warped so as to generate force pressing the fillet section 27 toward the vane 11 when it gets in contact with the structure 15.

In any of the embodiments described above, the seal 21 is, in a state of being combined with the inner liner 19, served for assembly. When integrated into the outlet guide vane along with the inner liner 19, the fillet section 27 at its tip gets contact with the face of the vane 11 and then warps upward so as to form a round corner that is unlikely to disturb airflow. As the vane 11 is formed in a curved surface, any structures could hardly establish gas-tight contact throughout its total length. The fillet section 27 of the present embodiment is no exception. The rib section 25, however, gets in contact with the top face of the structure 15 so as to, in place of the fillet section 27, keep gas tightness. The seal 21 thereby successfully seals airflow in the bypass dust.

More specifically, the seal of the present embodiment does not necessitate laborsome work but only require being attached to the liner and integrated in the outlet guide vane in order to seal airflow, and also does not cause turbulence in the airflow.

Although certain embodiments have been described above, modifications and variations of the embodiments described above will occur to those skilled in the art, in light of the above teachings.

INDUSTRIAL APPLICABILITY

A seal that merely requires being attached to a liner and, along with the liner and a vane, being integrated into outlet guide vanes is provided.

What is claimed is:

1. A seal for sealing a gap between a vane and a liner of an outlet guide vane, comprising:
   a joint section for joining with the liner;
   a flexible fillet section elongated from the joint section and tapering toward a tip so as to form a round corner between the vane and the liner when the tip is placed in contact with the vane; and
   a flexible rib section projecting from an inner surface and so dimensioned as to get in contact with an upper surface of an external structure for securing the vane to keep gas tightness.

2. The seal of claim 1, wherein the rib section comprises a shape of a cylindrical column, an elliptic column, a polygonal column, or a fillet shape tapering toward a tip.

3. The seal of claim 1, wherein the rib section is hollow so as to facilitate elastic crush.

4. The seal of claim 1, wherein the fillet section and the rib section are formed in a unitary body.

5. The seal of claim 1, wherein the fillet section is curved upward.

* * * * *